US012494152B1

(12) United States Patent
Wu

(10) Patent No.: US 12,494,152 B1
(45) Date of Patent: Dec. 9, 2025

(54) DISPLAY DRIVING DEVICE CONFIGURED TO COMPARE A FIRST DITHERING MAP WITH A SECOND DITHERING MAP, AND DISPLAY DRIVING METHOD

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/939,333

(22) Filed: Nov. 6, 2024

(51) Int. Cl.
*G09G 3/20* (2006.01)

(52) U.S. Cl.
CPC ......... *G09G 3/2044* (2013.01); *G09G 3/2003* (2013.01); *G09G 2310/08* (2013.01); *G09G 2320/0276* (2013.01)

(58) Field of Classification Search
USPC ........................................................ 345/696
See application file for complete search history.

(56) References Cited

U.S. PATENT DOCUMENTS 5,526,021 A * 6/1996 Naylor, Jr. ........... H04N 1/4051 358/3.14
11,475,597 B1 * 10/2022 Wang .................. H04N 17/002

* cited by examiner

*Primary Examiner* — Kirk W Hermann
(74) *Attorney, Agent, or Firm* — JCIPRNET

(57) ABSTRACT

The display driving device includes a processing module and a dithering module. The processing module is coupled to the dithering module. The processing module is configured to analyze reference image data to record a first dithering map, and compare the first dithering map with a second dithering map of the dithering module. When the processing module determines that the first dithering map and the second dithering map have same carry points at same pixel positions, the processing module is further configured to calibrate the second dithering map to generate a calibrated second dithering map.

20 Claims, 4 Drawing Sheets

DISPLAY DRIVING DEVICE CONFIGURED TO COMPARE A FIRST DITHERING MAP WITH A SECOND DITHERING MAP, AND DISPLAY DRIVING METHOD

BACKGROUND

Technical Field

The disclosure relates a display technology; particularly, the disclosure relates to a display driving device and a display driving method.

Description of Related Art

In a normal display driving process, a front-end processing chip of a display device may perform first dither processing on an image data according to a first dithering map, and then the timing controller may perform second dither processing on the image data according to the second dithering map, so as to generate output data to drive a display panel of the display device. However, if the first dithering map and the second dithering map have the same carry points, pixels corresponding to the same carry points in the displayed image may have obvious brightness changes. As a result, a flicker effect may appear in the continuous frames, which will affect the display quality.

SUMMARY

The disclosure provides a display driving device and a display driving method to achieve good display effects.

The display driving device of the disclosure includes a processing module and a dithering module. The processing module is coupled to the dithering module. The processing module is configured to analyze reference image data to record a first dithering map, and compare the first dithering map with a second dithering map of the dithering module. When the processing module determines that the first dithering map and the second dithering map have same carry points at same pixel positions, the processing module is further configured to calibrate the second dithering map to generate a calibrated second dithering map.

The display driving method of the disclosure is adapted to a display driving device. The display driving method includes the following steps: analyzing reference image data to record a first dithering map; comparing the first dithering map with a second dithering map of a dithering module; and when the first dithering map and the second dithering map have same carry points at same pixel positions, calibrating the second dithering map to generate a calibrated second dithering map.

Based on the above, according to the display driving device and the display driving method of the disclosure, the display driving device may effectively reduce the flicker problem in display screen.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
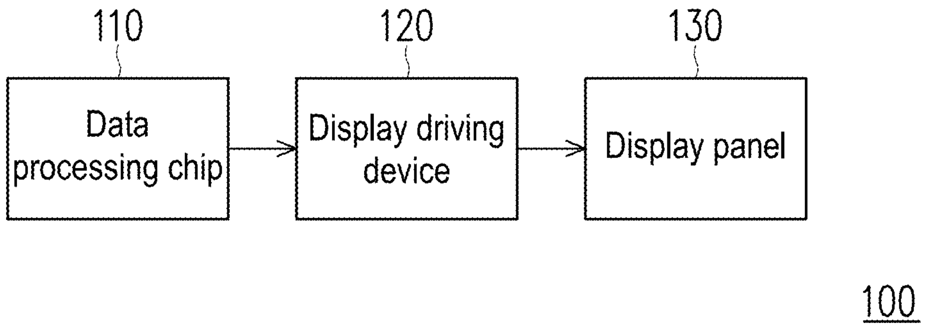
FIG. 1 is a schematic diagram of a display system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or electrically connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device.

FIG. 1 is a schematic diagram of a display system according to an embodiment of the disclosure. Referring to FIG. 1, the display system 100 includes a data processing chip 110, a display driving device 120, and a display panel 130. The display driving device 120 is coupled between the data processing chip 110 and the display panel 130. In the embodiment of the disclosure, the data processing chip 110 may be a system on a chip (SOC), and the display driving device 120 may be a timing controller (TCON). In the embodiment of the disclosure, the display system 100 may be a display apparatus. The data processing chip 110 may include an image data transform interface, and configured to receive original image data from an external image source. The data processing chip 110 may process the original image data to generate input image data (e.g. may change image resolution for the first time), and provide the input image data to the display driving device 120. The data processing chip 110 may further perform a first dither processing on the original image data to generate the input image data according to a plurality of first dithering maps corresponding to multiple frames sequence corresponding to one full image data. The data processing chip 110 may reduce the image resolution of the original image data, for example, from 8-bit to 6-bit, and perform dithering detection by frame sequence pattern to determine a plurality of carry points in the frame sequence of the input image data according to the plurality of first dithering maps.

Then, the display driving device 120 may further process the input image data to generate output image data (e.g. may change image resolution for the second time), and drive the display panel 130 according to the output image data. The display driving device 120 may further perform a second dither processing on the input image data to generate the output image data according to a plurality of second dithering maps corresponding to multiple frames sequence corresponding to one full image data. The display driving device 120 may change the image resolution of the original image data again, and perform dithering detection by frame sequence pattern to determine another plurality of carry points in the frame sequence of the output image data according to the plurality of second dithering maps. In this regard, the display driving device 120 may detect the plurality of first dithering maps and determine whether to change the another plurality of carry points in the plurality of second dithering maps to avoid the plurality of carry points overlapping the another plurality of carry points in the image data, so as to effectively reduce flicker problem of the continuous image screen.

Figure 2:
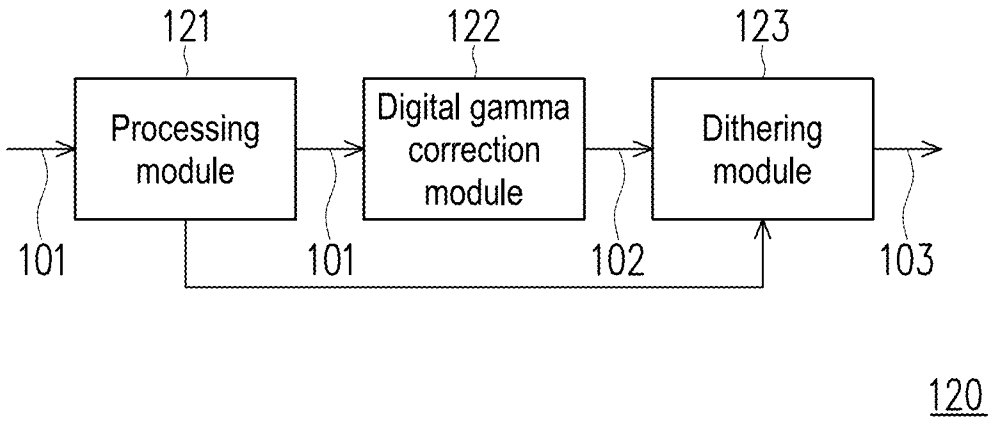
FIG. 2 is a schematic diagram of multiple modules of the display driving device according to an embodiment of the disclosure.

FIG. 2 is a schematic diagram of multiple modules of the display driving device according to an embodiment of the disclosure. Referring to FIG. 1 and FIG. 2, in the embodiment of the disclosure, the display driving device 120 may include a processing circuit and a memory. The processing circuit may be a field programmable gate array (FPGA), an application-specific integrated circuit (ASIC), or a microcontroller. The memory may include a static random-access memory (SRAM), a dynamic random-access memory (DRAM), a synchronized dynamic random-access memory (SDRAM), or a flash memory. In the embodiment of the disclosure, the memory may store multiple modules for reading and executing by the processing circuit. In the embodiment of the disclosure, the display driving device 120 may include a processing module 121, a digital gamma correction (DGC) module 122, and a dithering module 123.

Figure 3:
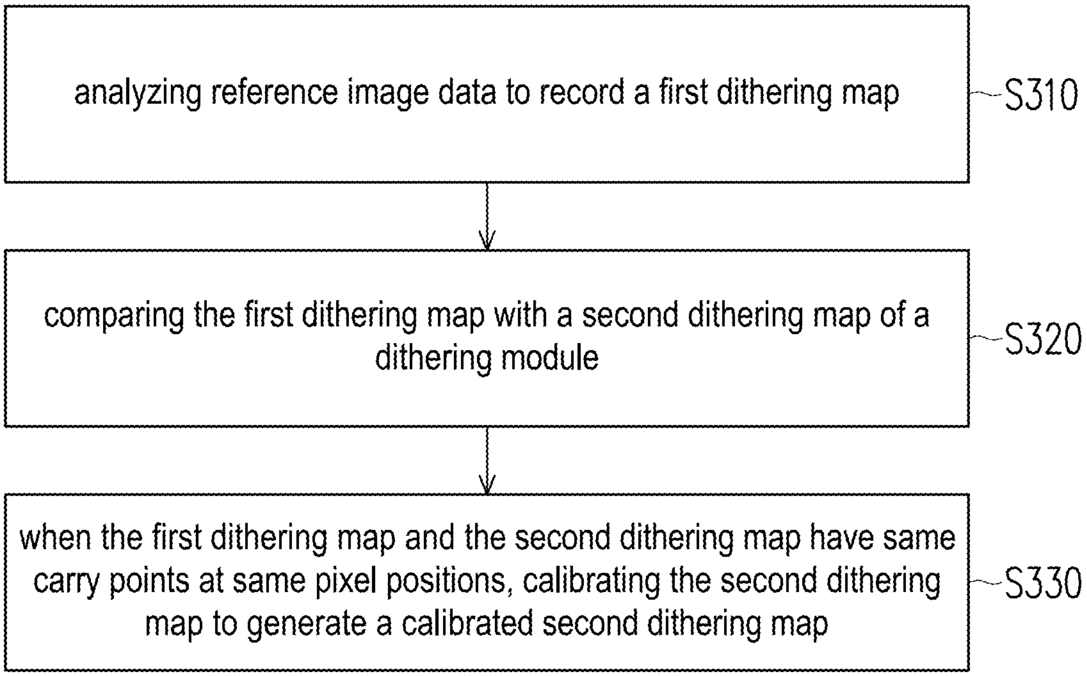
FIG. 3 is a flowchart of a display driving method according to an embodiment of the disclosure.

FIG. 3 is a flowchart of a display driving method according to an embodiment of the disclosure. Referring to FIG. 1 to FIG. 3, the display driving device 100 may execute the following steps S310~S330. In the embodiment of the disclosure, in a calibration mode, the data processing chip 110 may receive original reference image data. The original reference image data may be, for example, full image data for a 16-frame sequence, but the disclosure is not limited thereto. The original reference image data may be generated based on a predetermined gray level, and the predetermined gray level may be determined by the following formulas (1) and (2).

$$GL=2^n/2+k \qquad \text{formula (1)}$$

$$k=(2^{n-m})-1 \qquad \text{formula (2)}$$

In the formula (1), the symbol GL represents the predetermined gray level, and the symbol n represents a number of data bits for data processing applicable to the data processing chip 110. The symbol k is determined by the formula (2). In the formula (2), the symbol m represents a number of data bits for data processing applicable to the display driving device 120. In one embodiment of the disclosure, a user may set the original reference image data according to the formula (1), and input the original reference image data to the data processing chip 110. Then, the data processing chip 110 may process the original reference image data. The data processing chip 110 may be configured to perform first dither processing on the original reference image data to generate the reference image data according to a first dithering map. The data processing chip 110 may provide the reference image data to the display driving device 120. In the embodiment of the disclosure, the reference image data may include red pixel data, green pixel data, and blue pixel data (RGB data).

In step S310, the processing module 121 of the display driving device 120 may analyze the reference image data to record the first dithering map. In step S320, the processing module 121 may compare the first dithering map with a second dithering map of the dithering module 123. In step S330, when the processing module 121 determines that the first dithering map and the second dithering map have same carry points at same pixel positions, the processing module 121 may be further configured to calibrate the second dithering map to generate a calibrated second dithering map. The display driving device 120 may store the calibrated second dithering map. That is, the processing module 121 may re-set the dithering settings of the dithering module 123. In addition, in one embodiment of the disclosure, the same pixel positions may also be a plurality of sub-pixel positions (i.e. corresponding to a red sub-pixel, a green sub-pixel, and a blue sub-pixel respectively).

In the embodiment of the disclosure, the dithering maps (or dithering matrix) may refer to a pre-defined pattern or grid used in ordered dithering. The carry points in the dithering map may refer to the act of spreading the quantization error (the difference between the original pixel value and the quantized value) to neighboring pixels. The dithering maps is used to determine how pixel values are altered when reducing color depth. The dithering maps may consist of values that dictate how much each pixel's color should be adjusted based on its position in the grid, helping to distribute the limited colors evenly across the image.

Thus, in a display mode, when the processing module 121 receives input image data 101 processed by the first dither processing from the data processing chip 110, the processing module 121 further provides the input image data 101 to the digital gamma correction module 122. The digital gamma correction module 122 may perform digital gamma correction on the input image data 101 to generate corrected image data 102. Then, the digital gamma correction module 122 may perform second dither processing on the corrected image data 102 to generate an output image data 103 according to the calibrated second dithering map. That is, the display driving device 120 may auto re-set dither setting of the dithering module 123 to avoid the same carry points occurring at the same pixel positions in previous and subsequent dither processing results. Therefore, the display driving device 120 may effectively drive the display panel 130 according to the output image data 103, and may effectively reduce the flicker problem of the continuous image screen displayed by the display panel 130.

In one embodiment of the disclosure, since one full image data may correspond to multiple frame sequence, the processing module 121 may analyze the reference image data to record a plurality of first dithering maps, and compare the plurality of first dithering maps with a plurality of second dithering maps of the dithering module 123. When the processing module 121 determines that at least one of the first dithering maps and at least one of the corresponding second dithering maps have same carry points at same pixel positions in same frame, the processing module 121 may calibrate the at least one of the second dithering maps to generate at least one calibrated second dithering map.

Figure 4:
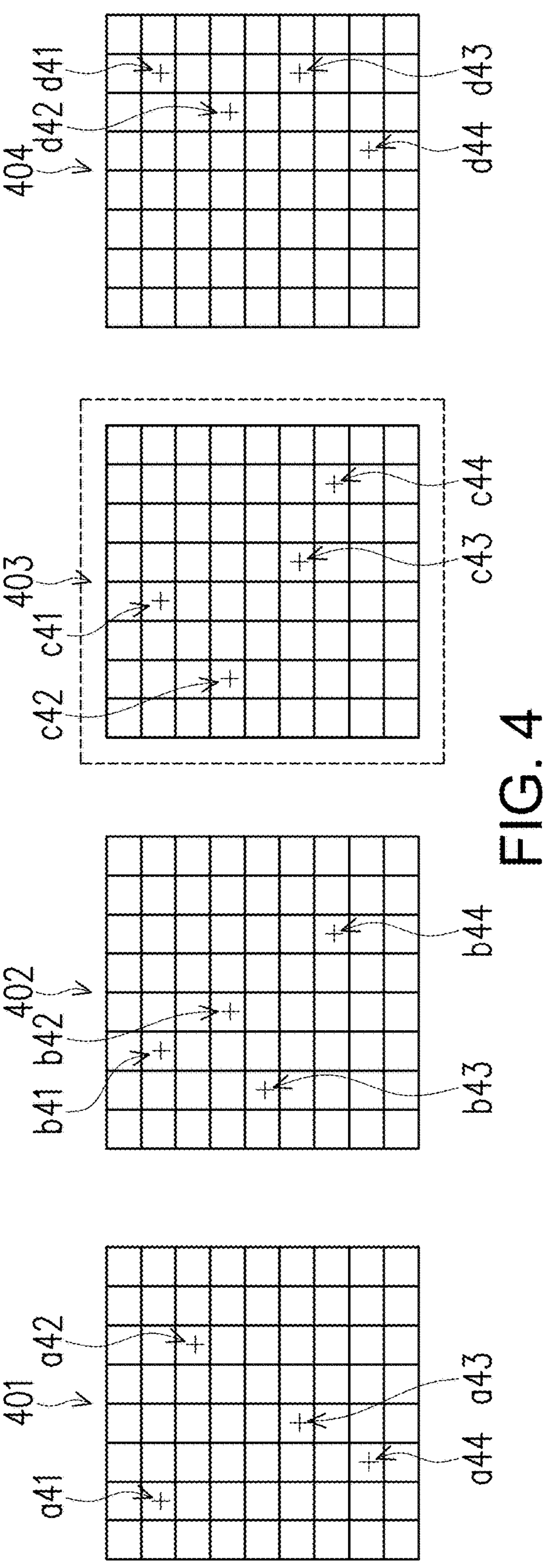
FIG. 4 is a schematic diagram of a plurality of first dithering maps according to an embodiment of the disclosure.
Figure 5:
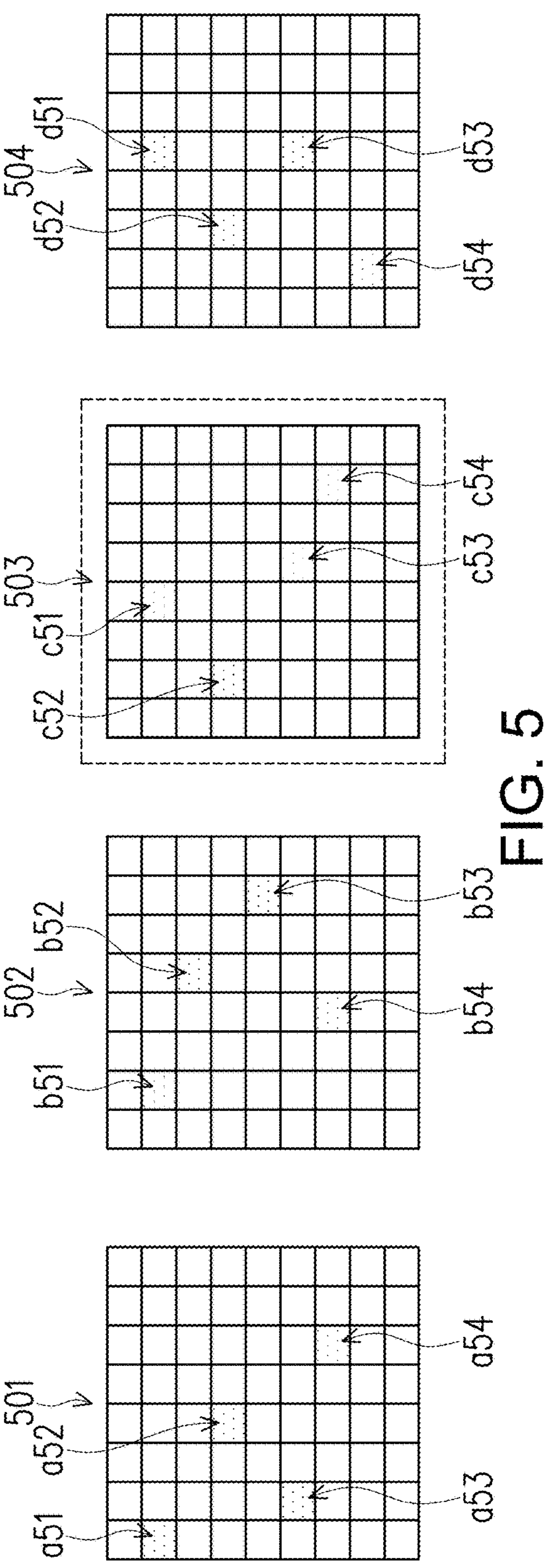
FIG. 5 is a schematic diagram of a plurality of second dithering maps according to an embodiment of the disclosure.
Figure 6:
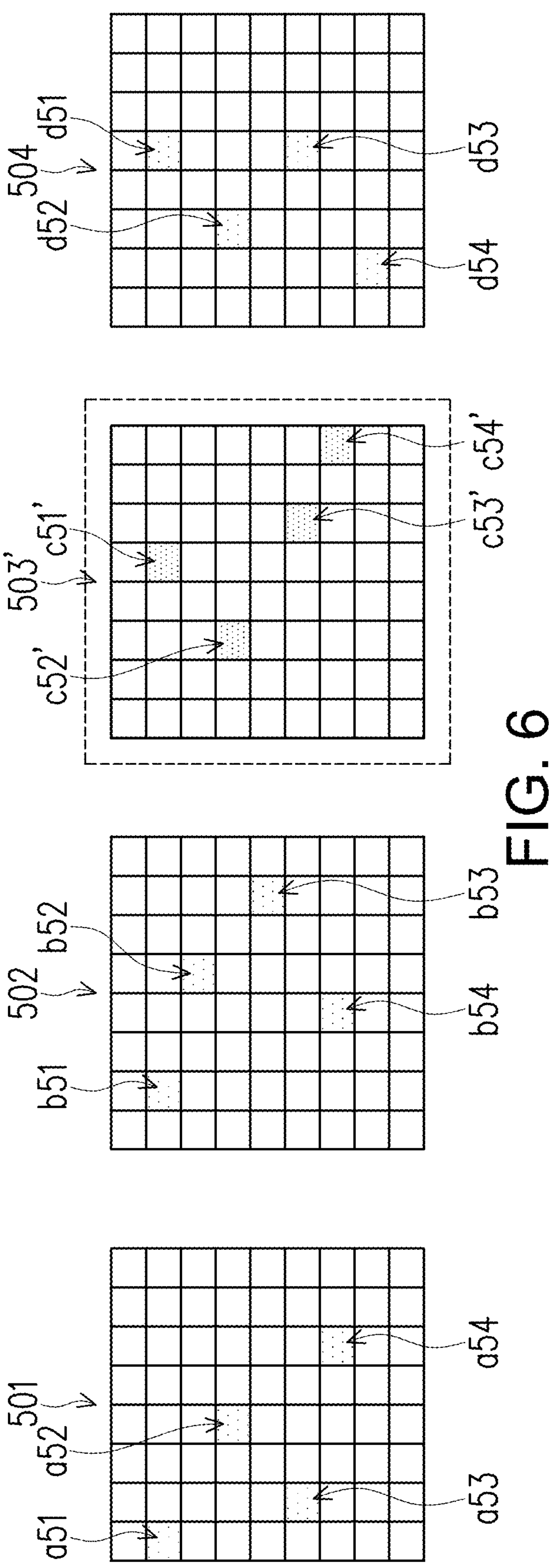
FIG. 6 is a schematic diagram of a plurality of second dithering maps according to an embodiment of the disclosure.

FIG. 4 is a schematic diagram of a plurality of first dithering maps according to an embodiment of the disclosure. FIG. 5 is a schematic diagram of a plurality of second dithering maps according to an embodiment of the disclosure. FIG. 6 is a schematic diagram of a plurality of first dithering maps according to an embodiment of the disclosure. Referring to FIG. 1, FIG. 3 to FIG. 6, taking one full image data has a 4-frame sequence as an example, the data processing chip 110 may receive the original reference image data, and process the original reference image data to generate the reference image data. For example, the data processing chip 110 may be adapted to 8-bit data processing, and the display driving device 120 may be adapted to 6-bit data processing. Thus, according to the above formulas (1) and (2), the symbol k is equal to 3 ($=(2^{8-6})-1$), and the predetermined gray level (GL) is equal to 131 ($=2^8/2+3$). In this case, due to the predetermined gray level of the original reference image data is 131 (8-bit data format), the gray level of the reference image data is 32.75 (=131/4) (6-bit data format). Therefore, the display driving device 120 may determine the plurality of carry points in a plurality of first dithering maps 401 to 404 as shown in FIG. 4 according to 32.75.

Specifically, the data processing chip 110 may perform first dither processing on the original reference image data to generate the reference image data according to the plurality of first dithering maps 401 to 404 as shown in FIG. 4 The first dithering map 401 may include a plurality of carry points a41 to a44. The first dithering map 402 may include a plurality of carry points b41 to b44. The first dithering map 403 may include a plurality of carry points c41 to c44. The first dithering map 404 may include a plurality of carry points d41 to d44. The processing module 121 may detect the reference image data provided by the data processing chip 110 to obtain the first dithering maps 401 to 404.

Then, the processing module 121 may read a plurality of second dithering maps 501 to 504 as shown in FIG. 5 from the dithering module 123. The second dithering map 501 may include a plurality of carry points a51 to a54. The second dithering map 502 may include a plurality of carry points b51 to b54. The second dithering map 503 may include a plurality of carry points c51 to c54. The second dithering map 504 may include a plurality of carry points d51 to d54. The processing module 121 may compare the first dithering maps 401 to 404 with the second dithering maps 501 to 504 in sequence. In this case, the processing module 121 may determine that the pixel positions of the carry points C41 to C44 of the first dithering map 403 are same the pixel positions of the carry points C51 to C54 of the second dithering map 503. Therefore, the processing module 121 may calibrate the second dithering map 503.

In one embodiment of the disclosure, the processing module 121 may shift the pixel position corresponding to each of the carry points C51 to C54 to an adjacent pixel position in the second dithering map 503. In the case, as shown as FIG. 6, the processing module 121 may shift each of the carry points C51 to C54 to the right by one pixel position. Thus, the processing module 121 may generate a calibrated second dithering map 503', and the calibrated second dithering map 503' may include a plurality of carry points C51' to C54' as shown in FIG. 6. However, in another one embodiment of the disclosure, the processing module 121 may also shift the pixel position corresponding to each of the carry points C51 to C54 to an adjacent diagonal pixel position.

The processing module 121 may store the calibrated second dithering map 503' into the dithering module 123 to replace the original second dithering map 503. Therefore, the processing module 121 may auto re-set dither setting of the dithering module 123 to avoid the same carry points occurring at the same pixel positions in first and second dither processing results, so the flicker effect of the image displayed by the display panel 130 may be effectively reduced.

In summary, the display driving device and display driving method of the disclosure may auto re-set dither setting of the display driving device, so as to effectively reduce flicker problem of the continuous image screen.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driving method, adapted to a display driving device, wherein the display driving method comprises:

analyzing reference image data to record a first dithering map;

comparing the first dithering map with a second dithering map of a dithering module; and when the first dithering map and the second dithering map have same carry points at same pixel positions, calibrating the second dithering map to generate a calibrated second dithering map.

2. The display driving method according to claim 1, wherein the step of calibrating the second dithering map comprises: when a processing module calibrates the second dithering map, shifting each of the pixel positions corresponding to each of the carry points to an adjacent pixel position.

3. The display driving method according to claim 2, wherein the step of shifting the pixel position corresponding to each of the carry points to the adjacent pixel position comprises:

shifting the pixel position corresponding to each of the carry points to an adjacent diagonal pixel position.

4. The display driving method according to claim 1, further comprising:

correcting an input image data to generate corrected image data by a digital gamma correction module, performing dither processing on the corrected image data to generate an output image data according to the calibrated second dithering map by the dithering module.

5. The display driving method according to claim 1, further comprising:

performing dither processing on an original reference image data to generate the reference image data according to the first dithering map by a data processing chip; and receiving the reference image data from the data processing chip.

6. The display driving method according to claim 5, wherein the original reference image data is generated based on a predetermined gray level, and the predetermined gray level is determined by following formulas (1) and (2), $$GL=2^n/2+3 \quad \text{formula (1)}$$

$$k=(2^{n-m})-1 \quad \text{formula (2)}$$

wherein the symbol GL represents the predetermined gray level, the symbol n represents a number of data bits for data processing applicable to the data processing chip, and the symbol m represents a number of data bits for data processing applicable to the display driving device.

7. The display driving method according to claim 1, wherein the display driving device is a timing controller.

8. The display driving method according to claim 1, wherein the same pixel positions are a plurality of sub-pixel positions.

9. The display driving method according to claim 1, wherein the reference image data comprises red pixel data, green pixel data, and blue pixel data.

10. The display driving method according to claim 1, further comprising:

analyzing the reference image data to record a plurality of first dithering maps;

comparing the plurality of first dithering maps with a plurality of second dithering maps of the dithering module; and when at least one of the first dithering maps and at least one of the corresponding second dithering maps have same carry points at same pixel positions in same frame, calibrating the at least one of the second dithering maps to generate at least one calibrated second dithering map.

11. A display driving device, comprising:

a processing module; and a dithering module, coupled to the processing module, wherein the processing module is configured to analyze reference image data to record a first dithering map, and compare the first dithering map with a second dithering map of the dithering module, wherein when the processing module determines that the first dithering map and the second dithering map have same carry points at same pixel positions, the processing module is further configured to calibrate the second dithering map to generate a calibrated second dithering map.

12. The display driving device according to claim 11, wherein when the processing module calibrates the second dithering map, the processing module shifts the pixel position corresponding to each of the carry points to an adjacent pixel position.

13. The display driving device according to claim 12, wherein the processing module shifts the pixel position corresponding to each of the carry points to an adjacent diagonal pixel position.

14. The display driving device according to claim 11, wherein the display driving device further comprises:

a digital gamma correction module, coupled between the processing module and the dithering module, and configured to correct an input image data to generate corrected image data, wherein the dithering module is configured to perform dither processing on the corrected image data to generate an output image data according to the calibrated second dithering map.

15. The display driving device according to claim 11, wherein the display driving device receives the reference image data from a data processing chip, and the data processing chip is configured to perform dither processing on an original reference image data to generate the reference image data according to the first dithering map.

16. The display driving device according to claim 15, wherein the original reference image data is generated based on a predetermined gray level, and the predetermined gray level is determined by following formulas (1) and (2), $$GL=2^n/2+k \quad \text{formula (1)}$$

$$k=(2^{n-m})-1 \quad \text{formula (2)}$$

wherein the symbol GL represents the predetermined gray level, the symbol n represents a number of data bits for data processing applicable to the data processing chip, and the symbol m represents a number of data bits for data processing applicable to the display driving device.

17. The display driving device according to claim 11, wherein the display driving device is a timing controller.

18. The display driving device according to claim 11, wherein the same pixel positions are a plurality of sub-pixel positions.

19. The display driving device according to claim 11, wherein the reference image data comprises red pixel data, green pixel data, and blue pixel data.

20. The display driving device according to claim 11, wherein the processing module is configured to analyze the reference image data to record a plurality of first dithering maps, and compare the plurality of first dithering maps with a plurality of second dithering maps of the dithering module, when the processing module determines that at least one of the first dithering maps and at least one of the corresponding second dithering maps have same carry points at same pixel positions in same frame, the processing module is further configured to calibrate the at least one of the second dithering maps to generate at least one calibrated second dithering map.

* * * * *